(12) United States Patent
Serpa et al.

(10) Patent No.: US 7,542,311 B2
(45) Date of Patent: Jun. 2, 2009

(54) METHOD FOR OPERATING A CONVERTER CIRCUIT, AND DEVICE FOR CARRYING OUT THE METHOD

(75) Inventors: Leonardo Serpa, Zürich (CH); Johann Walter Kolar, Zürich (CH); Simon Douglas Round, Zürich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 12/153,514

(22) Filed: May 20, 2008

(65) Prior Publication Data

US 2008/0278977 A1  Nov. 13, 2008

Related U.S. Application Data

(63) Continuation of application No. PCT/CH2006/000648, filed on Nov. 16, 2006.

(60) Provisional application No. 60/738,065, filed on Nov. 21, 2005.

(51) Int. Cl.
*H02M 1/12* (2006.01)
*H02M 7/527* (2006.01)

(52) U.S. Cl. .......................... 363/40; 363/98
(58) Field of Classification Search .................. 363/39, 363/40, 41, 95, 97, 98, 131, 132; 307/105
See application file for complete search history.

(56) References Cited

U.S. PATENT DOCUMENTS 6,166,928 A * 12/2000 Chandorkar .................. 363/34

(Continued)

OTHER PUBLICATIONS

Hernandez F et al:, "A generalized control scheme for active front-end multilevel converters", IECON'01., Proceedings of the 27th. Annual Conference of the IEEE Industrial Electronics Socienty., Denver, CO, Nov. 329-Dec. 2, 2001, Annual Conference of the IEEE Industrial Electronics Society, New York, NY, vol. 1 of 3, Conf. 27 Nov. 29, 2001, pp. 915-920.

(Continued)

*Primary Examiner*—Gary L Laxton
(74) *Attorney, Agent, or Firm*—Buchanan Ingersoll & Rooney PC (57) ABSTRACT

A method for operating a converter circuit is specified with the converter circuit having a converter unit with a multiplicity of controllable power semiconductor switches and having an energy storage circuit formed by two series-connected capacitors, in which the controllable power semiconductor switches are controlled by means of a control signal formed from a hysteresis signal vector (x), and the hysteresis signal vector (x) is formed from a difference-phase connection current vector ($\Delta i_{f,i}$) by means of a hysteresis regulator, and the difference-phase connection current vector ($\Delta i_{f,i}$) is formed from the subtraction of a phase connection current vector ($i_{f,i}$) from a reference phase connection current vector ($i_{f,i,ref}$), with the reference phase connection current vector ($i_{f,i,ref}$) being formed from a difference power value ($P_{diff}$), a difference wattless-component value ($Q_{diff}$) and a phase flux vector ($\psi_{g,\alpha\beta}$). In order to very largely stabilize the switching frequency of the controllable power semiconductor switches, a current correction value ($i_0$) is additionally subtracted in order to form the difference-phase connection current vector ($\Delta i_{f,i}$), with the current correction value ($i_0$) being formed by integration of a phase connection voltage mean value ($u_{inv,A}$), and the phase connection voltage mean value ($u_{inv,A}$) being formed by determining the arithmetic mean value of the phase connection voltages ($u_{inv,iM}$) with the reference point of the connection point of the capacitors in the energy storage circuit. A device is also specified, by means of which the method can be carried out in a particularly simple manner.

20 Claims, 5 Drawing Sheets

U.S. PATENT DOCUMENTS

| | | | | |
|---|---|---|---|---|
| 6,804,130 | B2* | 10/2004 | Morimoto | 363/132 |
| 7,310,253 | B2* | 12/2007 | Fujii et al. | 363/98 |
| 2006/0215425 | A1 | 9/2006 | Fu et al. | |

OTHER PUBLICATIONS

Malinowski M et al:, "A comparative study of control techniques for PWM rectifiers in AC adjustable speed drives", IECON'01., Proceedings of the 27th., Annual Conference of the IEEE Inudstrial Electronics Society., Denver, CO, Nov. 29-Dec. 2, 2001, Annual Conference of the IEEE Industrial Electronics Society, New York, NY, vol. 1 of 3, pp. 1114-1118.

Liserre M et al:, "Stability improvements of an LCL-filter based three-phase active rectifier", 33rd. Annual IEEE Power Electronics Specialists Conference. PESC 2002 Conference Proceedings. Cairns, Queensland, Australia, Jun. 23-27, 2002, Annual Power Electronics Specialist Conference, New York, vol. 2 of 4 Jun. 23, 2002, pp. 1195-1201.

Yifan Zhao et al:, "Force Commutated Three Level Boost Type Rectifier", IEEE Transactions on Industry Applications, IEEE Service Center, Piscataway, NJ, US, Jan. 1995, vol. 31, No. 1 pp. 155-161.

International Preliminary Report on Patentability PCT/IB/373.
Notification Concerning Transmittal of International Preliminary Report on Patentability PCT/IB/326.

* cited by examiner

METHOD FOR OPERATING A CONVERTER CIRCUIT, AND DEVICE FOR CARRYING OUT THE METHOD

RELATED APPLICATIONS

This is a continuation application under 35 U.S.C. §120 of PCT/CH2006/000648 filed as an International Application on Nov. 16, 2006 designating the U.S., which claims the benefit of U.S. Provisional Patent No. 60/738,065 filed on Nov. 21, 2005, under 35 U.S.C. 365(c), the entire contents of which are hereby incorporated by reference in their entireties.

TECHNICAL FIELD

The disclosure relates to the field of power electronics, and in particular to a method for operating a converter circuit, and to an device for carrying out the method.

BACKGROUND INFORMATION

Figure 1:
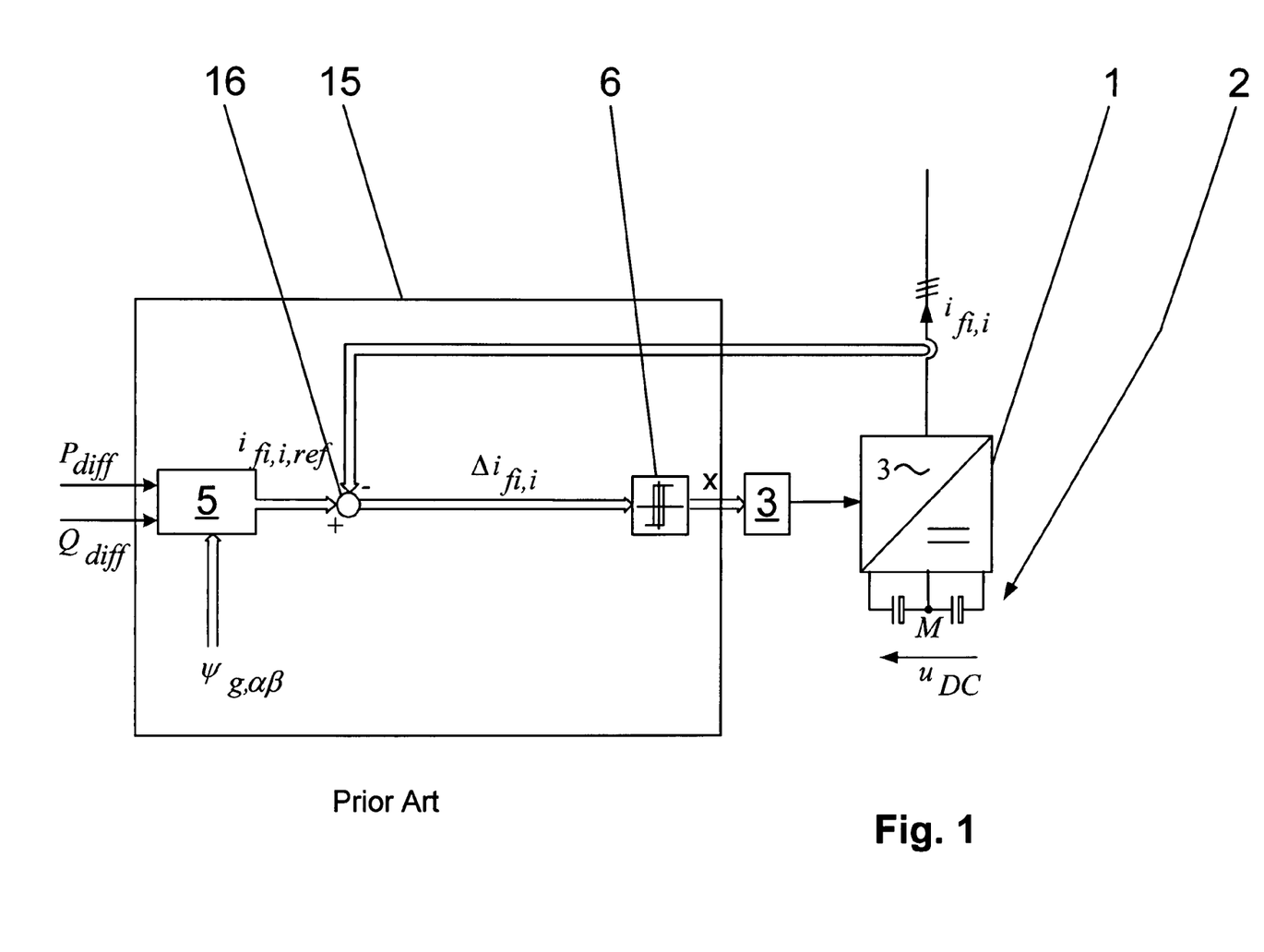
FIG. 1 shows one embodiment of a device for carrying out a method for operating a converter circuit according to the prior art.

Conventional converter circuits have a converter unit with a multiplicity of controllable power semiconductor switches, which are switched in a known manner in order to switch at least two switching voltage levels. Furthermore, by way of example, an LCL-filter can be connected to each phase connection of the converter unit. FIG. 1 shows one embodiment of a device for carrying out a method for operating a converter circuit according to the prior art. The converter circuit in FIG. 1 has a converter unit 1. The converter unit 1 shown in FIG. 1 is connected to an energy storage circuit 2 which is formed in the conventional manner by two series-connected capacitors. In order to operate the converter circuit, a device is provided which has a control device 15 for producing a hysteresis signal vector x, which device 15 is connected to the controllable power semiconductor switches in the converter unit 1 via a control circuit 3 for forming a control signal S from the hysteresis signal vector x. The power semiconductor switches are therefore controlled by means of a control signal S. The hysteresis signal vector x is formed by means of a hysteresis regulator 6 from a difference-phase connection current vector $\Delta i_{f,i}$. The difference-phase connection current vector $\Delta i_{f,i}$ is in turn formed from subtraction of a phase connection current vector $i_{f,i}$ from a reference phase connection current vector $i_{f,i,ref}$, with the reference phase connection current vector $i_{f,i,ref}$ being formed from a reference power value $P_{diff}$, a reference wattless-component value $Q_{diff}$ and a phase flux vector $\psi_{g,\alpha\beta}$.

Figure 4:
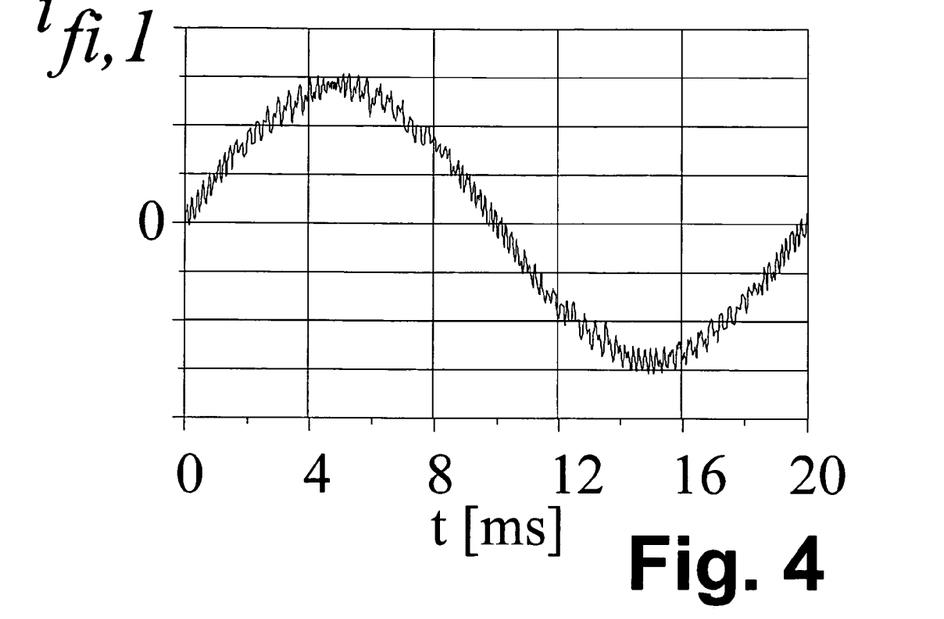
FIG. 4 shows a time profile of a phase connection current for one phase in a method for operating the converter circuit according to the prior art.

The method for operating a converter circuit described above is subject to the problem that the switching frequency of the power semiconductor switches varies to a very major extent as a result of the formation of the reference phase connection current $i_{f,i,ref}$ from the reference power value $P_{ref}$, from the reference wattless component value $Q_{ref}$ and from the phase flux vector $\psi_{g,\alpha\beta}$. A switching frequency which is variable to such a major extent results in a significant increase in the harmonics in the phase connection currents $i_{fg,i}$ and in the phase connection voltages $u_{inv,i}$ on the converter circuit. In this context, FIG. 4 shows a corresponding time profile of a phase connection current $i_{fg,1}$ which is subject to major harmonics, for one phase. By way of example, when the converter circuit is connected to an electrical interconnected power supply system, such high harmonic components are undesirable or are unacceptable. For example, when the converter circuit is connected to an electrical load, harmonics such as these can lead to damage or even destruction, and are therefore very highly undesirable.

SUMMARY

A method for operating a converter circuit is disclosed, by means of which the switching frequency of controllable power semiconductor switches in a converter unit in the converter circuit can be kept virtually constant. Also disclosed is a device by means of which the method can be carried out in a particularly simple manner.

A method for operating a converter circuit is disclosed, with the converter circuit having a converter unit with a multiplicity of controllable power semiconductor switches and having an energy storage circuit formed by two series-connected capacitors, in which the controllable power semiconductor switches are controlled by means of a control signal formed from a hysteresis signal vector (x), and the hysteresis signal vector (x) is formed from a difference-phase connection current vector ($\Delta i_{f,i}$) by means of a hysteresis regulator, and the difference-phase connection current vector ($\Delta i_{f,i}$) is formed from the subtraction of a phase connection current vector ($i_{f,i}$) from a reference phase connection current vector ($i_{f,i,ref}$), with the reference phase connection current vector ($i_{f,i,ref}$) being formed from a difference power value ($P_{diff}$), a difference wattless-component value ($Q_{diff}$) and a phase flux vector ($\psi_{g,\alpha\beta}$), wherein a current correction value ($i_0$) is additionally subtracted in order to form the difference-phase connection current vector ($\Delta i_{f,i}$) in that the current correction value ($i_0$) is formed by integration of a phase connection voltage mean value ($u_{inv,A}$), and in that the phase connection voltage mean value ($u_{inv,A}$) is formed by determining the arithmetic mean value of the phase connection voltages ($u_{inv,iM}$) with the reference point of the connection point of the capacitors in the energy storage circuit.

A device for carrying out a method for operating a converter circuit is disclosed, with the converter circuit having a converter unit with a multiplicity of controllable power semiconductor switches and having an energy storage circuit formed by two series-connected capacitors, having a control device which is used to produce a hysteresis signal vector (x) and is connected via a control circuit for forming a control signal to the controllable power semiconductor switches, with the control device having a hysteresis regulator for forming the hysteresis signal vector (x) from a difference-phase connection current vector ($\Delta i_{f,i}$), a first adder for forming the difference-phase connection current vector ($\Delta i_{f,i}$) from the subtraction of a phase connection current vector ($i_{f,i}$) from a reference phase connection current vector ($i_{f,i,ref}$) and a first calculation unit for forming the reference phase connection current vector ($i_{f,i,ref}$) from a difference power value ($P_{diff}$), a difference wattless component value ($Q_{diff}$) and a phase flux vector ($\psi_{g,\alpha\beta}$), wherein a current correction value ($i_0$) is additionally supplied to the first adder in order to form the difference-phase connection current vector ($\Delta i_{f,i}$), in order to form the difference-phase connection current vector ($\Delta i_{f,i}$) from the subtraction of the phase connection current vector ($i_{f,i}$) and the current correction value ($i_0$) from the reference phase connection current vector ($i_{f,i,ref}$), in that the control device comprises an integrator for forming the current correction value ($i_0$) by integration of a phase connection voltage mean value ($u_{inv,A}$), and an averager for forming the phase connection voltage mean value ($u_{inv,A}$) by determining the arithmetic mean value of the phase connection voltages ($u_{inv,iM}$) with the reference point of the connection point of the capacitors in the energy storage circuit.

These and further objects, advantages and features of the present disclosure will become obvious from the following detailed description of exemplary embodiments of the disclosure, and in conjunction with the drawing.

The reference symbols used in the drawing and their meanings are listed in a summarized form in the list of reference symbols. In principle, identical parts are provided with the same reference symbols in the figures. The described embodiments represent examples of the subject matter of the disclosure, and have no restrictive effect.

DETAILED DESCRIPTION

The converter circuit has a converter unit with a multiplicity of controllable power semiconductor switches, and an energy storage circuit formed by two series-connected capacitors. In the method according to the disclosure for operating the converter circuit, the controllable power semiconductor switches are now controlled by means of a control signal which is formed from a hysteresis signal vector, with the hysteresis signal vector being formed from a difference-phase connection current vector by means of a hysteresis regulator, and with the difference-phase connection current vector being formed from the subtraction of a phase connection current vector from a reference phase connection current vector. The reference phase connection current vector is furthermore formed from a reference power value, a reference wattless component value and a phase flux vector. According to the disclosure, a current correction value is additionally subtracted in order to form the difference-phase connection current vector, with the current correction value being formed by integration of a phase connection voltage mean value, with the phase connection voltage mean value being formed by determining the arithmetic mean value of the phase connection voltages with the reference point of the connection point of the capacitors in the energy storage circuit. The current correction value formed in this way allows the switching frequency of the controllable power semiconductor switches in the converter unit to be kept virtually constant. The very largely constant switching frequency also allows the harmonics in the phase connection currents and in the phase connection voltages of the converter unit to be kept low.

The device according to the disclosure for carrying out the method for operating the converter circuit has a control device which is used to produce a hysteresis signal vector and is connected to the controllable power semiconductor switches via a control circuit for forming the control signal, with the control device having a hysteresis regulator in order to form the hysteresis signal vector from the difference-phase connection current vector, a first adder in order to form the difference-phase connection current vector from the subtraction of the phase connection current vector from the reference phase correction current vector, and a first calculation unit in order to form the reference phase connection current vector from the reference power value, the reference wattless component value and the phase flux vector. Furthermore, the current correction value is also supplied to the first adder in order to form the difference-phase connection current vector, in order to form the difference-phase connection current vector from the subtraction of the phase connection current vector and the current correction value from the reference phase connection current vector. Furthermore, the control device has an integrator in order to form the current correction value by integration of a phase connection voltage mean value, and an averager in order to form the phase connection voltage mean value by determining the arithmetic mean value of the phase connection voltages with the reference point of the connection point of the capacitors in the energy storage circuit.

The device according to the disclosure for carrying out the method for operating a converter circuit can then be produced very easily and cost-effectively, since the circuit complexity can be kept extremely low and, furthermore, only a small number of components are required to construct it. The method according to the invention can therefore be carried out particularly easily by means of this device.

Figure 2:
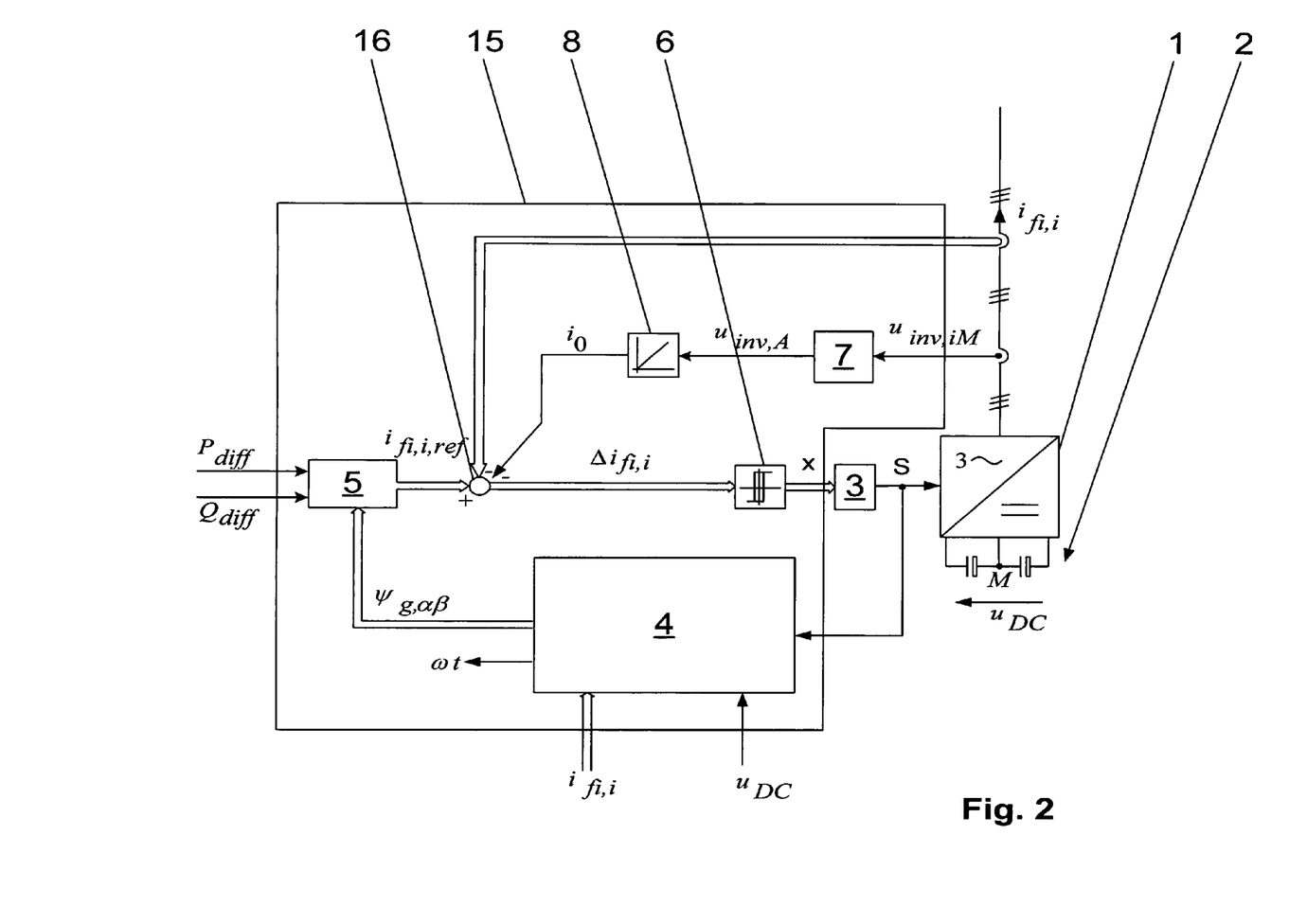
FIG. 2 shows a first exemplary embodiment of a device according to the disclosure for carrying out the method according to the disclosure for operating the converter circuit.

FIG. 2 shows a first exemplary embodiment of a device according to the disclosure for carrying out the method according to the disclosure for operating a converter circuit. As shown in FIG. 2, the converter circuit has a converter unit 1 with a multiplicity of controllable power semiconductor switches, and an energy storage circuit 2 formed by two series-connected capacitors. By way of example, the converter unit 1 in FIG. 2 is shown as having three phases. It should be mentioned that the converter unit 1 may in general be designed as any converter unit 1 for switching two or more switching voltage levels (multi-level converter circuit) with respect to the voltage of the energy storage circuit 2 connected to the converter unit 1.

Figure 5:
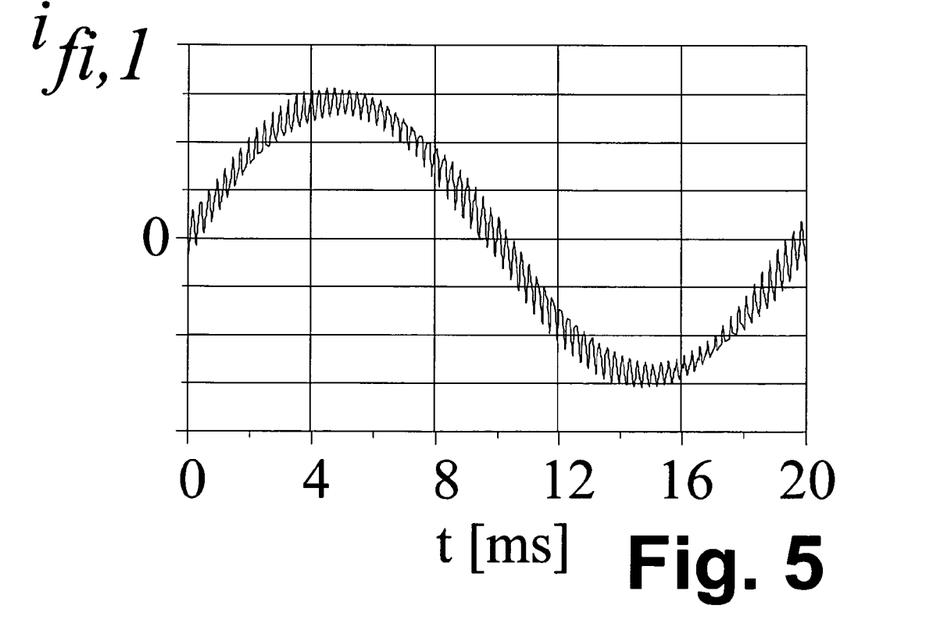
FIG. 5 shows a time profile of the phase connection current for one phase using the method according to the disclosure.

In the method according to the disclosure for operating the converter circuit, the controllable power semiconductor switches in the converter unit 1 are now controlled by means of a control signal S formed from a hysteresis signal vector x. A look-up table is used in the normal manner to form the control signal, in which hysteresis signal vectors x are associated in a fixed form with corresponding control signals S, or a modulator which is based on pulse-width modulation. It should be noted that all the vectors with the index i have vector components corresponding to the total of i phases, that is to say if i=3 phases, the corresponding vectors also have i=3 vector components. The hysteresis signal vector x is also formed from a difference-phase connection current vector $\Delta i_{fi,i}$ by means of a hysteresis regulator 6, and the difference-phase connection current vector $\Delta i_{fi,i}$ is in turn formed from the subtraction of a phase connection current vector $i_{fi,i}$ from a reference phase connection current vector $i_{fi,i,ref}$, with the reference phase connection current vector $i_{fi,i,ref}$ being formed from a difference power value $P_{diff}$, a difference wattless component $Q_{diff}$ and a phase flux vector $\psi_{g,\alpha\beta}$. The vector components of the phase connection current vector $i_{fi,i}$ are typically measured by means of current sensors at the appropriate phase connections of the converter unit 1. According to the disclosure, a current correction value $i_0$ is additionally subtracted in order to form the difference-phase connection current vector $\Delta i_{fi,i}$, and the current correction value $i_0$ is formed by integration of a phase connection voltage mean value $u_{inv,A}$, with the phase connection voltage mean value $u_{inv,A}$ being formed by determining the arithmetic mean value of the phase connection voltages $u_{inv,iM}$ with the reference point of the connection point M of the capacitors in the energy storage circuit 2. The current correction value $i_0$ means that the switching frequency of the controllable power semiconductor switches in the converter unit 1 can be kept virtually constant. The very largely constant switching frequency in turn allows the harmonics in the phase connection currents $i_{fi,i}$ and in the phase connection voltages $u_{inv,i}$ of the converter unit 1 to be kept low. In this context, FIG. 5 shows a time profile of the phase connection current $i_{fi,1}$ for one phase when using the method according to the disclosure, showing that a considerable reduction can be achieved in the harmonics in the profile in comparison to the profile shown in FIG. 4 for a conventional method.

The phase flux vector $\psi_{g,\alpha\beta}$ can be formed from the phase connection current vector $i_{fi,i}$, from the control signal S and from an instantaneous DC voltage value $u_{DC}$ in the energy storage circuit 2. This will be described in detail in the foreign text. It should be noted that all the vectors with the index $\alpha\beta$ as vector components have an $\alpha$-component of the space vector transformation of the corresponding variable, and a $\beta$-component of the space vector transformation of the corresponding variables.

The space vector transformation is in general defined as follows:

$$\overline{y} = y_\alpha + j y_\beta$$

and $$y_\alpha = \sqrt{\frac{2}{3}}\left(y_1 - \frac{1}{2}y_2 + y_3\right)$$

$$y_\beta = \sqrt{\frac{1}{2}}(y_2 - y_3)$$

where $\overline{y}$ is a complex variable, $y_\alpha$ is the $\alpha$-component of the space vector transformation of the variable $\overline{y}$ and $y_\beta$ is the $\beta$-component of the space vector transformation of the variable $\overline{y}$, and $y_1$, $y_2$, $y_3$ are vector components of the vector y associated with the complex variable $\overline{y}$. All of the already mentioned space vector transformations of variables and those which will be mentioned in the following text are produced using the formulae quoted above, in which case these can be produced separately in a calculation unit provided specifically for this purpose, or else in the calculation unit in which the corresponding $\alpha$-components and $\beta$-components are required for calculation of another variable.

The phase flux $\psi_g$ is obtained in a general form, using complex notation as:

$$\overline{\psi}_g = \int \overline{u}_{inv} \cdot dt - L_g \cdot i_{fi,i}$$

where $$u_{inv,\alpha} = \sqrt{\frac{2}{3}}\, u_{DC} \cdot f_1(S)$$

and $$u_{inv,\beta} = \sqrt{\frac{1}{2}}\, u_{DC} \cdot f_2(S)$$

and $L_g$ is a power supply system inductance and $f_1(S)$, $f_2(S)$ are predeterminable switching functions of the control signal S. The formulae mentioned above can therefore be used to form the phase flux vector $\psi_{g,\alpha\beta}$, that is to say in particular its components $\psi_{g,\alpha}$, $\psi_{g,\beta}$, in a very simple form.

According to the exemplary embodiment shown in FIG. 2, the difference power value $P_{diff}$ corresponds to a predeterminable reference power value $P_{ref}$ and the difference wattless component value $Q_{diff}$ corresponds to a predeterminable reference wattless component value $Q_{ref}$.

In addition to the hysteresis regulator 6 which has been mentioned in order to form the hysteresis signal vector x from the difference-phase connection current vector $\Delta i_{fi,i}$, the control device 15 in the device shown in FIG. 2 also has a first adder 16 in order to form the difference-phase connection current vector $\Delta i_{fi,i}$ from the subtraction of the phase connection current vector $i_{fi,i}$ from the reference phase connection current vector $i_{fi,i,ref}$ and a first calculation unit 5 in order to form the reference phase connection current vector $i_{fi,i,ref}$ from the difference power value $P_{diff}$, the difference wattless component value $Q_{diff}$ and a phase flux vector $\psi_{g,\alpha\beta}$. According to the disclosure, in order to form the difference-phase connection current vector $\Delta i_{fi,i}$ the first adder 16 is additionally supplied with the current correction value $i_0$ in order to form the difference-phase connection current vector $\Delta i_{fi,i}$ from the subtraction of the phase connection current vector $i_{fi,i}$ and the current correction value $i_0$ from the reference phase connection current vector $i_{fi,i,ref}$. Furthermore, the control device 15 shown in FIG. 2 has, according to the disclosure, an integrator 8 in order to form the current correction value $i_0$ by integration of the phase connection voltage mean value $u_{inv,A}$, and an averager 7 in order to form the phase connection voltage mean value $u_{inv,A}$ by determining the arithmetic mean value of the phase connection voltages $u_{inv,iM}$ with the reference point of the connection point M of the capacitors in the energy storage circuit 2. The device according to the disclosure for carrying out the method for operating the converter circuit can therefore be produced very easily and cost-effectively, since the circuit complexity can be kept extremely low and, furthermore, only a small number of components are required to construct it. The method according to the disclosure can accordingly be carried out particularly easily by means of this device.

As shown in FIG. 2, the control device 15 has a second calculation unit 4 in order to form the phase flux vector $\psi_{g,\alpha\beta}$ from the phase connection current vector $i_{fi,i}$, from the control signal S and from the instantaneous DC voltage value $u_{DC}$ from the energy storage circuit 2.

Figure 3:
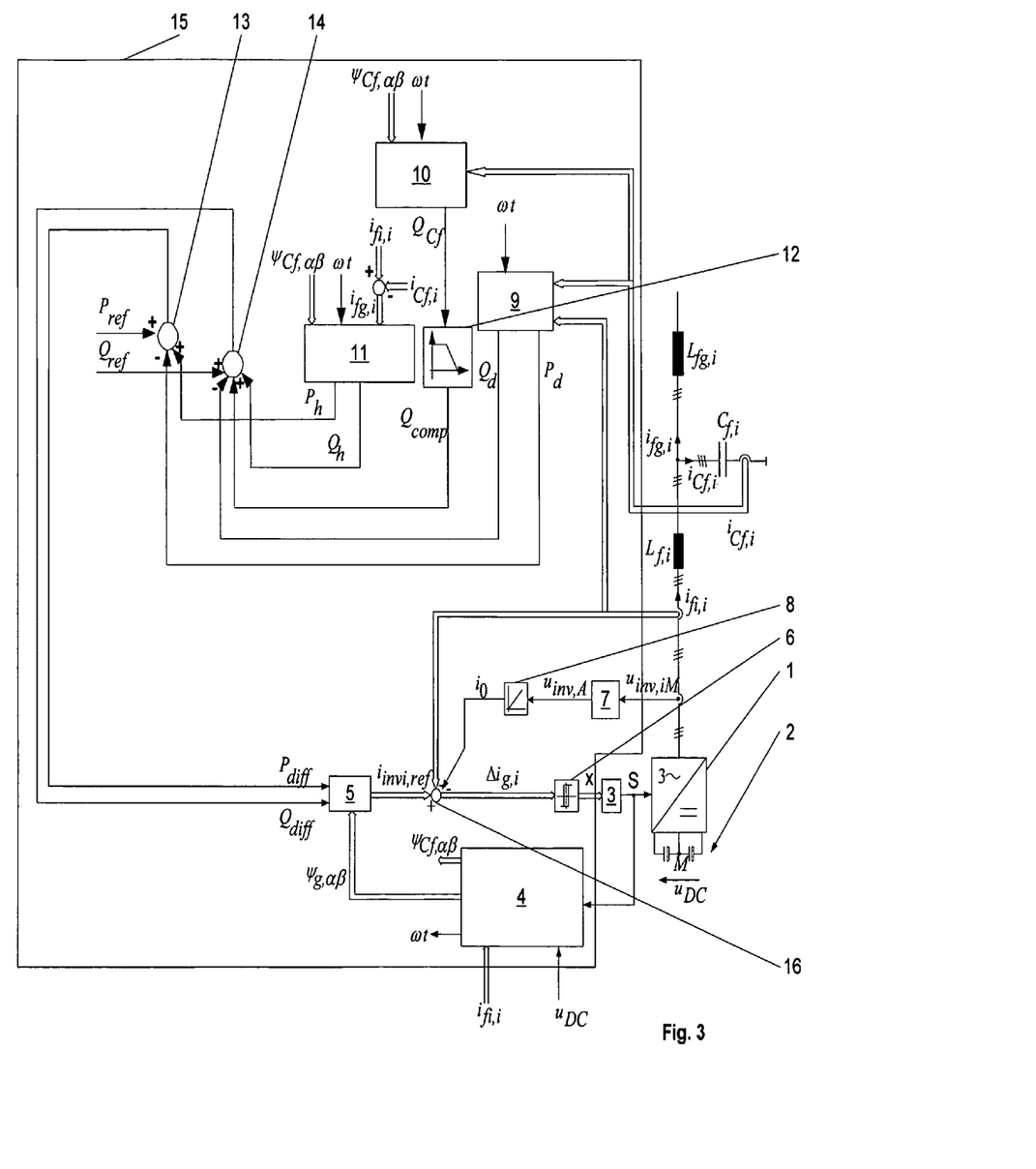
FIG. 3 shows a second exemplary embodiment of a device according to the disclosure for carrying out the method according to the disclosure for operating the converter circuit.

FIG. 3 shows a second exemplary embodiment of a device according to the disclosure for carrying out the method according to the disclosure for operating the converter circuit. In this figure, an LCL-filter $L_{fi,i}$, $C_{fi}$, $L_{fg,i}$ is connected to each phase connection of the converter unit 1. Once again, the index i represents the number i of phases. Accordingly, each LCL-filter has a first filter inductance $L_{fi}$ a second filter inductance $L_{fg}$ and a filter capacitance $C_f$, with the first filter inductance $L_f$ being connected to the associated phase connection of the converter unit 1, to the second filter inductance $L_{fg}$ and to the filter capacitance $C_f$. The filter capacitances $C_f$ of the individual LCL-filters are also connected to one another.

According to the method, in the exemplary embodiment shown in FIG. 3, the difference power value $P_{diff}$ is formed from subtraction of a damping power value $P_d$ from the sum of a reference power value $P_{ref}$ and at least one compensation harmonic power value $P_h$ with respect to the fundamental frequency of the filter output current vector $i_{fg,i}$ of the LCL-filter, with the damping power value $P_d$ being formed from a sum, weighted with a variable damping factor $k_d$, of a multiplication of an $\alpha$-component of the space vector transformation of filter capacitance currents $i_{Cf\alpha}$ of the LCL-filter by an α-component of the space vector transformation $i_{fi\alpha}$ of the components of the phase connection current vector $i_{fi,i}$, and multiplication of a β-component of the space vector transformation of filter capacitance currents $i_{Cf\beta}$ of the LCL-filter by a β-component of the space vector transformation $i_{fi\beta}$ of the components of the phase connection current vector $i_{fi,i}$. The difference wattless component value $Q_{diff}$ is, furthermore, formed from subtraction of the sum of a reference wattless component value $Q_{ref}$ and at least one compensation harmonic wattless component value $Q_h$ with respect to the fundamental frequency of the filter output current vector $i_{fg,i}$ of the LCL-filter, with the damping wattless component value $Q_d$ being formed from a difference, weighted with the variable damping factor $k_d$, of a multiplication of the β-component of the space vector transformation of the filter capacitance currents $i_{Cf\beta}$ of the LCL-filter by the α-component of the space vector transformation $i_{fi\alpha}$ of the components of the phase connection current vector $i_{fi,i}$, and multiplication of the α-component of the space vector transformation of the filter capacitance currents $i_{Cf\alpha}$ of the LCL-filter by the β-component of the space vector transformation $i_{fi\beta}$ of the components of the phase connection current vector $i_{fi,i}$. As shown in FIG. 3, the filter capacitance currents are measured by means of current sensors at the corresponding filter capacitances $C_{f,i}$ and are vector components of the filter capacitance current vector $i_{Cf,i}$ as illustrated in FIG. 3.

The damping power value $P_d$ is formed using the following formula:

$$P_d = k_d \cdot (i_{Cf\alpha} \cdot i_{fi\alpha} + i_{Cf\beta} \cdot i_{fi\beta})$$

The reference power value $P_{ref}$ as shown in FIG. 3 is freely variable, and is the nominal value of the power which is intended to be produced at the output of the LCL-filter.

The damping wattless component value $Q_d$ is formed using the following formula:

$$Q_d = k_d \cdot (i_{Cf\beta} \cdot i_{fi\alpha} - i_{Cf\alpha} \cdot i_{fi\beta})$$

The reference wattless component value $Q_{ref}$ as shown in FIG. 3 is freely variable, and is the nominal value of the wattless component which is intended to be produced at the output of the LCL-filter.

It should be noted that the formation of the damping power value $P_d$ and of the damping wattless component value $Q_d$ can be avoided by just calculating a damping current vector from the α-component of the space vector transformation of filter capacitance currents $i_{Cf\alpha}$ of the LCL-filter and from the β-component of the space vector transformation of filter capacitance currents $i_{Cf\beta}$ of the LCL-filter by suitable filtering, which damping current vector is then included directly in the formation of the reference phase connection current vector $i_{fi,i,ref}$ and therefore in the formation of the difference-phase connection current vector $\Delta i_{fi,i}$. This is associated with a saving of computation time, since there is no need to calculate the damping power value $P_d$ and the damping wattless component value $Q_d$.

The damping power value $P_d$ and the damping wattless component value $Q_d$ make it possible to actively dampen distortion, that is to say undesirable oscillations, in the filter output currents $i_{fg,i}$ and filter output voltages, so that this distortion is greatly reduced and, best of all, is very largely suppressed. There is also no need to connect a discrete, space-consuming complex and therefore expensive damping resistance at the respective phase connection, in order to allow the undesirable distortion to be effectively damped. The addition or connection of at least one compensation harmonic power value $P_h$ in order to form the difference power value $P_{diff}$ and of at least one compensation harmonic wattless component value $Q_h$ to form the difference wattless component value $Q_{diff}$ can result in active reduction of harmonics, and therefore, overall, in a further improvement in the reduction of harmonics.

As shown in FIG. 3, the control device 15 has a second adder 13 in order to form the difference power value $P_{diff}$ from the subtraction of the damping power value $P_d$ from the sum of a reference power value $P_{ref}$ and at least one compensation harmonic power value $P_h$ with respect to the fundamental frequency of the filter output current vector $i_{fg,i}$ of the LCL-filter, with the control device 15 having a third calculation unit 9 in order to form the damping power value $P_d$ from the sum, weighted by a variable damping factor $k_d$, of a multiplication of the α-component of the space vector transformation of filter capacitance currents $i_{Cf\alpha}$ of the LCL-filter by the α-component of the space vector transformation $i_{fi\alpha}$ of the components of the phase connection current vector $i_{fi,i}$, and multiplication of the β-component of the space vector transformation of filter capacitance currents $i_{Cf\beta}$ of the LCL-filter by the β-component of the space vector transformation $i_{fi\beta}$ of the components of the phase connection current vector $i_{fi,i}$. Furthermore, the control device 15 has a third adder 14 in order to form the difference wattless component value $Q_{diff}$ from the subtraction of the sum of a reference wattless component value $Q_{ref}$ and at least one compensation harmonic wattless component value $Q_h$ with respect to the fundamental frequency of the filter output current vector $i_{fg,i}$ of the LCL-filter, with the third calculation unit 9 additionally being used to form the damping wattless component value $Q_d$ from a difference, weighted with the variable damping factor $k_d$, of a multiplication of the β-component of the space vector transformation of filter capacitance currents $i_{Cf\beta}$ of the LCL-filter by the α-component of the space vector transformation $i_{fi\alpha}$ of the components of the phase connection current vectors $i_{fi,i}$ and multiplication of the α-component of the space vector transformation of filter capacitance currents $i_{Cf\alpha}$ of the LCL-filter by the β-component of the space vector transformation $i_{fi\beta}$ of the components of the phase connection current vector $i_{fi,i}$. It is also feasible for the damping power value $P_d$ and the damping wattless component value $Q_d$ to be formed just from the α-component of the space vector transformation of filter capacitance currents $i_{Cf\alpha}$ of the LCL-filter with an α-component of the space vector transformation $i_{fi\alpha}$ of the components of the phase connection current vector $i_{fi,i}$ and multiplication of a β-component of the space vector transformation by filter capacitance currents $i_{Cf\beta}$ of the LCL-filter.

According to FIG. 3, a compensation wattless component value $Q_{comp}$ is also added in order to form the difference wattless component value $Q_{diff}$, with the compensation wattless component value $Q_{comp}$ being formed by low-pass filtering of an estimated filter capacitance wattless component value $Q_{Cf}$. This can avoid undesirable wattless components of the LCL-filter, in particular of the filter capacitances $C_{f,i}$ of the LCL-filter, being produced at the output of the LCL-filter, so that it is possible to ensure that only a wattless component value corresponding to the selected reference wattless component value $Q_{ref}$ is produced at the output of the LCL-filter. As shown in FIG. 3, the compensation wattless component $Q_{comp}$ is also supplied to the third adder in order to form the difference wattless component value $Q_{diff}$, with the compensation wattless component value $Q_{comp}$ being formed by low-pass filtering of an estimated filter capacitance wattless component value $Q_{Cf}$ by means of a low-pass filter 12. The estimated filter capacitance wattless component value $Q_{Cf}$ is furthermore formed from the α-component of the space vector transformation of the filter capacitance currents $i_{Cf\alpha}$, from the β-component of the space vector transformation of the filter capacitance currents $i_{Cf\beta}$, from an estimated filter capacitance flux vector $\psi_{Cf,\alpha\beta}$ and from the fundamental frequency angle ωt with respect to the fundamental frequency of the filter output current vector $i_{fg,i}$, as is illustrated in particular by the following formula.

$$Q_{Cf} = \omega \cdot (\psi_{Cf\alpha} \cdot i_{Cf\alpha} + \psi_{Cf\beta} \cdot i_{Cf\beta})$$

In order to form the estimated filter capacitance wattless component $Q_{Cf}$, the control device 15 has, as shown in FIG. 1, a fourth calculation unit 10 by means of which the estimated filter capacitance wattless component value $Q_{Cf}$ is calculated using the above formula.

The estimated filter capacitance flux vector $\psi_{Cf,\alpha\beta}$ is formed, as shown in FIG. 3, from the instantaneous DC voltage value $u_{DC}$ in the energy storage circuit 2, from the control signal S, from the α-component of the space vector transformation $i_{fi\alpha}$ of the components of the phase connection current vector $i_{fi,i}$ and from the β-component of the space vector transformation $i_{fi\beta}$ of the components of the phase connection current vector $i_{fi,i}$. The second calculation unit 4 is therefore additionally used to form the estimated filter capacitance flux vector $\psi_{Cf,\alpha\beta}$ from the instantaneous DC voltage value $u_{DC}$ in the energy storage circuit 2, from the control signal S, from the α-component of the space vector transformation $i_{fi\alpha}$ of the components of the phase connection current vector $i_{fi,i}$ and from the β-component of the space vector transformation $i_{fi\beta}$ of the components of the phase connection current vector $i_{fi,i}$.

The α-component of the space vector transformation $\psi_{Cf\alpha}$ of the filter capacitance flux vector $\psi_{Cf,\alpha\beta}$ is therefore formed using the following formula:

$$\psi_{Cf\alpha} = \int u_{inv,\alpha} dt - L_f i_{fi\alpha}$$

In a corresponding manner, the β-component of the space vector transformation $\psi_{Cf\beta}$ of the filter capacitance flux vector $\psi_{Cf,\alpha\beta}$ is formed using the following formula:

$$\psi_{Cf\beta} = \int u_{inv,\beta} dt - L_f i_{fi\beta}$$

As shown in FIG. 3, the already mentioned compensation harmonic power value $P_h$ and the compensation harmonic wattless component value $Q_h$ are each formed from the α-component of the space vector transformation of the filter output currents $i_{fg\alpha}$, from the β-component of the space vector transformation of the filter output currents $i_{fg\beta}$, from an α-component of the space vector transformation of the filter output fluxes $\psi_{L\alpha}$, from a β-component of the space vector transformation of the filter output fluxes $\psi_{L\beta}$ and from the fundamental frequency angle ωt with respect to the fundamental frequency of the filter output current vector $i_{fg,i}$.

The α-component of the space vector transformation of filter output fluxes $\psi_{L\alpha}$ is formed from an α-component of the space vector transformation of estimated filter capacitance fluxes $\psi_{Cf\alpha}$ and from the α-component of the space vector transformation of filter output currents $i_{fg\alpha}$, in particular as illustrated by the following formula.

$$\psi_{L\alpha} = \psi_{Cf\alpha} - L_{fg} \cdot i_{fg\alpha}$$

Furthermore, the β-component of the space vector transformation of filter output fluxes $\psi_{L\beta}$ is formed from a β-component of the space vector transformation of estimated filter capacitance fluxes $\psi_{Cf\beta}$ and from the β-component of the space vector transformation of filter output currents $i_{fg\beta}$, in particular as illustrated by the following formula.

$$\psi_{L\beta} = \psi_{Cf\beta} - L_{fg} \cdot i_{fg\beta}$$

The α-component of the space vector transformation of filter output fluxes $\psi_{L\alpha}$ and the β-component of the space vector transformation of filter output fluxes $\psi_{L\beta}$ can be calculated, for example, in the second calculation unit 4 or can also be calculated in the fifth calculation unit 11, although this is not illustrated for the sake of clarity, in FIG. 3.

Figure 6:
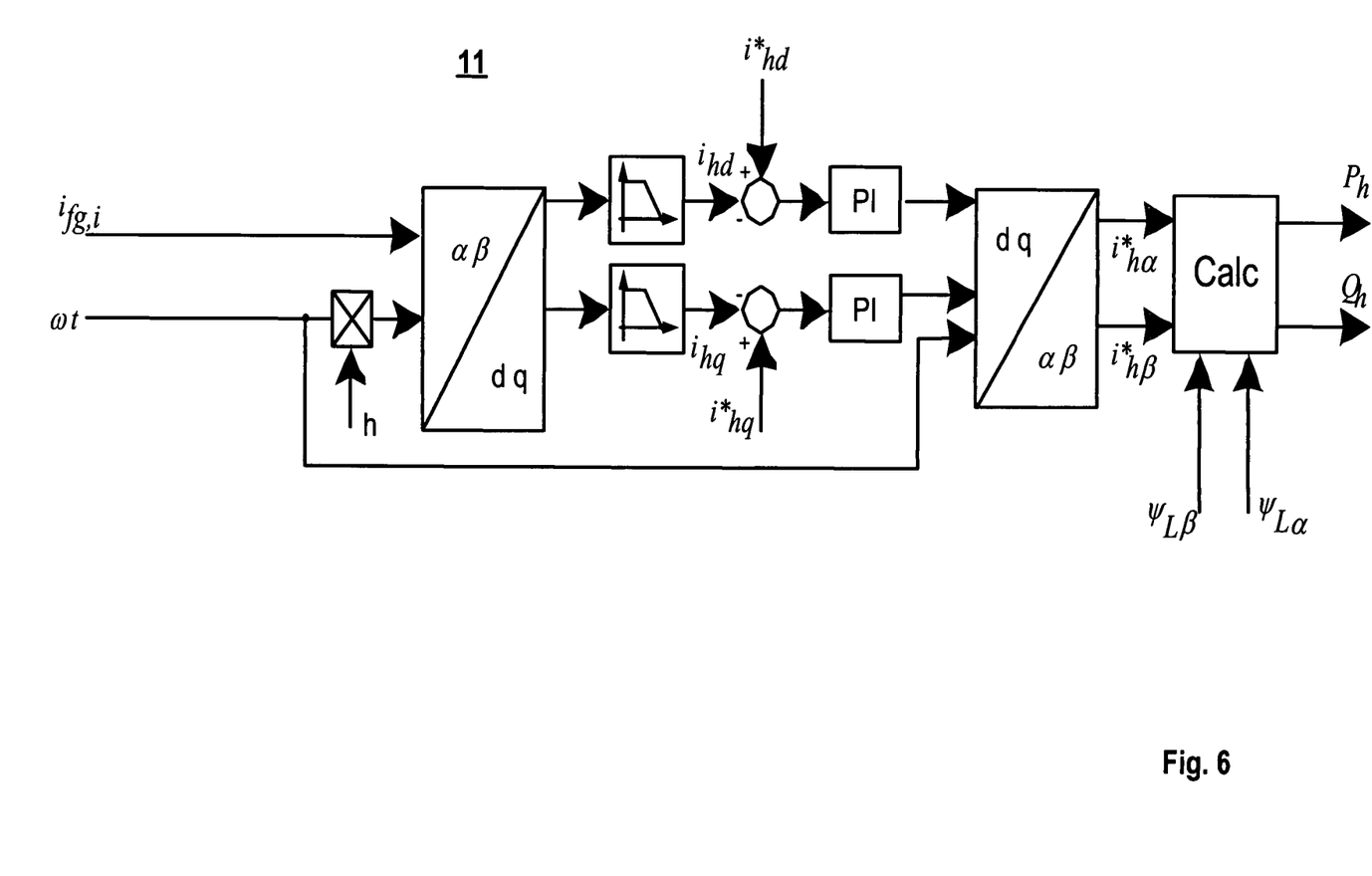
FIG. 6 shows one exemplary embodiment of a fifth calculation unit.

The control device 15 has a fifth calculation unit 11 in order to form the compensation harmonic power value $P_h$ and the compensation harmonic wattless component value $Q_h$ in each case from the α-component of the space vector transformation of filter output currents $i_{fg\alpha}$, from the β-component of the space vector transformation of filter output currents $i_{fg\beta}$, from the α-component of the space vector transformation of filter output fluxes $\psi_{L\alpha}$, from the β-component of the space vector transformation of filter output fluxes $\psi_{L\beta}$ and from the fundamental frequency angle ωt with respect to the fundamental frequency of the filter output current vector $i_{fg,i}$. The filter output current vector $i_{fg,i}$ is calculated very easily from the phase connection current vector $i_{fi,i}$ and from the filter capacitance current vector $i_{Cf,i}$, as shown in FIG. 3. The fundamental frequency angle ωt is provided to the calculation units 9, and 11 from the second calculation unit 4, as shown in FIG. 3 from a phase locked loop (or PLL for short) of the second calculation unit 4. FIG. 6 shows one exemplary embodiment of the fifth calculation unit 11. As shown in FIG. 6, the α-component of the space vector transformation of filter output currents $i_{fg\alpha}$ and the β-component of the space vector transformation of filter output currents $i_{fg\beta}$ are first of all formed by the space vector transformation of filter output current vector $i_{fg,i}$ that is supplied, in the fifth calculation unit 11. After this, the α-component of the space vector transformation of filter output currents $i_{fg\alpha}$ and the β-component of the space vector transformation of filter output currents $i_{fg\beta}$ are Park-Clarke-transformed, or low-pass filtered and are emitted as a d-component and the q-component of the Park-Clarke-Transformation of at least one desired selected harmonic of the filter output currents $i_{hd}$, $i_{hq}$ with respect to the fundamental frequency of the filter output currents $i_{fg1}$, $i_{fg2}$, $i_{fg3}$. The index h represents the h-th harmonic of this variable and the variables mentioned in the following text, where h=1, 2, 3, . . . .

The Park-Clarke-Transformation is in general defined as:

$$\bar{a} = (a_d + j a_q) e^{j\omega t}$$

where $\bar{a}$ is a complex variable, $a_d$ is the d-component of the Park-Clarke-Transformation of the variables $\bar{a}$ and $a_q$ is the q-component of the Park-Clarke-Transformation of the variable $\bar{a}$. In the Park-Clarke-Transformation, not only is the fundamental frequency of the complex variable $\bar{a}$ transformed, but also all of the harmonics that occur in the complex variable $\bar{a}$. As shown in FIG. 6, the d-component and the q-component of the Park-Clarke-Transformation of the desired selected h-th harmonic of the filter output currents $i_{hd}$, $i_{hq}$ are each regulated at an associated predeterminable reference value $i^*_{hd}$, $i^*_{hq}$, e.g., on the basis of a Proportional-Integral-Characteristic, and are then inverse-Park-Clarke-transformed, as a result of which an α-component of the space vector transformation of the h-th harmonic of the reference filter output currents $i^*_{h\alpha}$ and a β-component of the space vector transformation of the h-th harmonic of the reference filter output currents $i^*_{h\beta}$ are formed. Finally, the compensation harmonic power value $P_h$ and the compensation harmonic wattless component value $Q_h$ are each calculated from the α-component of the space vector transformation of the h-th harmonic of reference filter output currents $i^*_{h\alpha}$, the β-component of the space vector transformation of the h-th harmonic of reference filter output currents $i^*_{h\beta}$, the α-component of the space vector transformation of filter output fluxes $\psi_{L\alpha}$ and from the β-component of the space vector transformation of filter output fluxes $\psi_{L\beta}$, in particular as illustrated by the following formulae:

$$P_h = \omega \cdot (\psi_{L\alpha} \cdot i^*_{h\beta} - \psi_{L\beta} \cdot i^*_{h\alpha})$$

$$Q_h = \omega \cdot (\psi_{L\alpha} \cdot i^*_{h\alpha} + \psi_{L\beta} \cdot i^*_{h\beta})$$

All the steps in the method according to the disclosure may be implemented as software, which can then be loaded and run, for example, on a computer system, in particular with a digital signal processor. The digital delay times that occur in a system such as this, in particular for the calculations, may, for example, be taken into account in a general form by addition of an additional term to the fundamental frequency $\omega t$ in the Park-Clarke-Transformation. Furthermore, the device according to the disclosure as described in detail above may also be implemented in a computer system, in particular in a digital signal processor.

Overall, it has been possible to show that the device according to the disclosure, in particular as illustrated in FIG. 2 and FIG. 3, for carrying out the method according to the disclosure for operating the converter circuit can be implemented in a very simple form and cost effectively, since the circuit complexity is extremely low and, furthermore, only a small number of components are required to construct it. The method according to the disclosure can therefore be carried out particularly simply by means of this device.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Converter unit
2 Energy storage circuit
3 Control circuit
4 Second calculation unit
5 First calculation unit
6 Hysteresis regulator
7 Averager
8 Integrator
9 Third calculation unit
10 Fourth calculation unit
11 Fifth calculation unit
12 Low-pass filter
13 Second adder
14 Third adder
15 Control device
16 First adder

What is claimed is:

1. A method for operating a converter circuit, with the converter circuit having a converter unit with a multiplicity of controllable power semiconductor switches and having an energy storage circuit formed by two series-connected capacitors, in which the controllable power semiconductor switches are controlled by means of a control signal formed from a hysteresis signal vector (x), and the hysteresis signal vector (x) is formed from a difference-phase connection current vector ($\Delta i_{fi,i}$) by means of a hysteresis regulator, and the difference-phase connection current vector ($\Delta i_{fi,i}$) is formed from the subtraction of a phase connection current vector ($i_{fi,i}$) from a reference phase connection current vector ($i_{fi,i,ref}$), with the reference phase connection current vector ($i_{fi,i,ref}$) being formed from a difference power value ($P_{diff}$), a difference wattless-component value ($Q_{diff}$) and a phase flux vector ($\psi_{g,\alpha\beta}$), wherein a current correction value ($i_0$) is additionally subtracted in order to form the difference-phase connection current vector ($\Delta i_{fi,i}$)

wherein the current correction value ($i_0$) is formed by integration of a phase connection voltage mean value ($u_{inv,A}$), and wherein the phase connection voltage mean value ($u_{inv,A}$) is formed by determining the arithmetic mean value of the phase connection voltages ($u_{inv,iM}$) with the reference point of the connection point of the capacitors in the energy storage circuit.

2. The method as claimed in claim 1, wherein the phase flux vector ($\psi_{g,\alpha\beta}$) is formed from the phase connection current vector ($i_{fi,i}$), from the control signal and from an instantaneous DC voltage value ($u_{DC}$) of the energy storage circuit.

3. The method as claimed in claim 1, wherein an LCL-filter ($L_{f,i}$, $C_{fi}$, $L_{fg,i}$) is connected to each phase connection of the converter unit, wherein the difference power value ($P_{diff}$) is formed from subtraction of a damping power value ($P_d$) from the sum of a reference power value ($P_{ref}$) and at least one compensation harmonic power valve ($P_h$) with respect to the fundamental frequency of the filter output current vector ($i_{fg,i}$) of the LCL-filter, with the damping power value ($P_d$) being formed from a sum, weighted by a variable damping factor ($k_d$) of a multiplication of an $\alpha$-component of the space vector transformation of filter capacitance currents ($i_{Cf\alpha}$) of the LCL-filter by an $\alpha$-component of the space vector transformation ($i_{fi\alpha}$) of the components of the phase connection current vector ($i_{fi,i}$), and multiplication of a $\beta$-component of the space vector transformation of filter capacitance currents ($i_{Cf\beta}$) of the LCL-filter by a $\beta$-component of the space vector transformation ($i_{fi\beta}$) of the components of the phase connection current vector ($i_{fi,i}$), wherein the difference wattless component value ($Q_{diff}$) is formed from subtraction of the sum of a reference wattless component value ($Q_{ref}$) and at least one compensation harmonic wattless component value ($Q_h$) with respect to the fundamental frequency of the filter output current vector ($i_{fg,i}$) of the LCL-filter, with the damping wattless component value ($Q_d$) being formed from a difference, weighted by the variable damping factor ($k_d$), of a multiplication of the $\beta$-component of the space vector transformation of filter capacitance currents ($i_{Cf\beta}$) of the LCL-filter by the $\alpha$-component of the space vector transformation ($i_{fi\alpha}$) of the components of the phase connection current vector ($i_{fi,i}$) and multiplication of the $\alpha$-component of the space vector transformation of filter capacitance currents ($i_{Cf\alpha}$) of the LCL-filter by the $\beta$-component of the space vector transformation ($i_{fi\beta}$) of the components of the phase connection current vector ($i_{fi,i}$).

4. The method as claimed in claim 3, wherein, in order to form the difference wattless component value ($Q_{diff}$) a compensation wattless component value ($Q_{comp}$) is also added, with the compensation wattless component value ($Q_{comp}$) being formed by low-pass filtering of an estimated filter capacitance wattless component value ($Q_{Cf}$).

5. The method as claimed in claim 4, wherein the estimated filter capacitance wattless component value ($Q_{Cf}$) is formed from the $\alpha$-component of the space vector transformation of the filter capacitance currents ($i_{Cf\alpha}$), from the $\beta$-component of the space vector transformation of the filter capacitance currents ($i_{C f \beta}$), from an estimated filter capacitance flux vector ($\psi_{Cf,\alpha\beta}$) and from the fundamental frequency angle ($\omega t$) with respect to the fundamental frequency of the filter output current vector ($i_{fg,i}$).

6. The method as claimed in claim 5, wherein the estimated filter capacitance flux vector ($\psi_{Cf,\alpha\beta}$) is formed from an instantaneous DC voltage value ($u_{DC}$) of the energy storage circuit, from the control signal, from the $\alpha$-component of the space vector transformation ($i_{fi\alpha}$) of the components of the phase connection current vector ($i_{fi,i}$) and from the $\beta$-component of the space vector transformation ($i_{fi\beta}$) of the components of the phase connection current vector ($i_{fi,i}$).

7. The method as claimed in claim 3, wherein the compensation harmonic power value ($P_h$) and the compensation harmonic wattless component value ($Q_h$) are each formed from the $\alpha$-component of the space vector transformation of the filter output currents ($i_{fg\alpha}$), from the $\beta$-component of the space vector transformation of the filter output currents ($i_{fg\beta}$), from an $\alpha$-component of the space vector transformation of the filter output fluxes ($\psi_{L\alpha}$), from a $\beta$-component of the space vector transformation of the filter output fluxes ($\psi_{L\beta}$) and from the fundamental frequency angle ($\omega t$) with respect to the fundamental frequency of the filter output current vector ($i_{fg,i}$).

8. The method as claimed in claim 1, wherein the difference power value ($P_{diff}$) corresponds to a predeterminable reference power value ($P_{ref}$), and wherein the difference wattless component value ($Q_{diff}$) corresponds to a predeterminable reference wattless component value ($Q_{ref}$).

9. A device for carrying out a method for operating a converter circuit, with the converter circuit having a converter unit with a multiplicity of controllable power semiconductor switches and having an energy storage circuit formed by two series-connected capacitors,
  having a control device which is used to produce a hysteresis signal vector (x) and is connected via a control circuit for forming a control signal to the controllable power semiconductor switches, with the control device having a hysteresis regulator for forming the hysteresis signal vector (x) from a difference-phase connection current vector ($\Delta i_{fi,i}$), a first adder for forming the difference-phase connection current vector ($\Delta i_{fi,i}$) from the subtraction of a phase connection current vector ($i_{fi,i}$) from a reference phase connection current vector ($i_{fi,i,ref}$) and a first calculation unit for forming the reference phase connection current vector ($i_{fi,i,ref}$) from a difference power value ($P_{diff}$), a difference wattless component value ($Q_{diff}$) and a phase flux vector ($\psi_{g,\alpha\beta}$), wherein
  a current correction value ($i_0$) is additionally supplied to the first adder in order to form the difference-phase connection current vector ($\Delta i_{fi,i}$), in order to form the difference-phase connection current vector ($\Delta i_{fi,i}$) from the subtraction of the phase connection current vector ($i_{fi,i}$) and the current correction value ($i_0$) from the reference phase connection current vector ($i_{fi,i,ref}$),
  wherein the control device comprises
  an integrator for forming the current correction value ($i_0$) by integration of a phase connection voltage mean value ($u_{inv,A}$), and
  an averager for forming the phase connection voltage mean value ($u_{inv,A}$) by determining the arithmetic mean value of the phase connection voltages ($u_{inv,iM}$) with the reference point of the connection point of the capacitors in the energy storage circuit.

10. The device as claimed in claim 9, wherein the control device has a second calculation unit for forming the phase flux vector ($\psi_{g,\alpha\beta}$) from the phase connection current vector ($i_{fi,i}$), from the control signal and from an instantaneous DC voltage value ($u_{DC}$) of the energy storage circuit.

11. The device as claimed in claim 9, wherein an LCL-filter ($L_{fi}$, $C_{fi}$, $L_{fg,i}$) is connected to each phase connection of the converter unit,
  wherein the control device has a second adder in order to form the difference power value ($P_{diff}$) from the subtraction of a damping power value ($P_d$) from the sum of a reference power value ($P_{ref}$) and at least one compensation harmonic power value ($P_h$) with respect to the fundamental frequency of the filter output current vector ($i_{fg,i}$) of the LCL-filter, with the control device having a third calculation unit (9) in order to form the damping power value ($P_d$) from a sum which is weighted with a variable damping factor ($k_d$) of a multiplication of an $\alpha$-component of the space vector transformation of the filter capacitance currents ($i_{Cf\alpha}$) of the LCL-filter by an $\alpha$-component of the space vector transformation ($i_{fi\alpha}$) of the components of the phase connection current vector ($i_{fi,i}$) and multiplication of a $\beta$-component of the space vector transformation of filter capacitance currents ($i_{Cf\beta}$) of the LCL-filter by a $\beta$-component of the space vector transformation ($i_{fi\beta}$) of the components of the phase connection current vector ($i_{fi,i}$),
  wherein the control device has a third adder in order to form the difference wattless component value ($Q_{diff}$) from the subtraction of the sum of a reference wattless component value ($Q_{ref}$) and at least one compensation harmonic wattless component value ($Q_h$) with respect to the fundamental frequency of the filter output current vector ($i_{fg,i}$) of the LCL-filter, with the third calculation unit additionally being used to form the damping wattless component value ($Q_d$) from a difference, which is weighted with the variable damping factor ($k_d$) between a multiplication of the $\beta$-component of the space vector transformation of filter capacitance currents ($i_{Cf\beta}$) of the LCL-filter by the $\alpha$-component of the space vector transformation ($i_{fi\alpha}$) of the components of the phase connection current vector ($i_{fi,i}$), and multiplication of the $\alpha$-component of the space vector transformation of filter capacitance currents ($i_{Cf\alpha}$) of the LCL-filter by the $\beta$-component of the space vector transformation ($i_{fi\beta}$) of the components of the phase connection current vector ($i_{fi,i}$).

12. The device as claimed in claim 11, wherein, in order to form the difference wattless component ($Q_{diff}$), the third area is additionally supplied with a compensation wattless component ($Q_{comp}$), with the compensation wattless component value ($Q_{comp}$) being formed by low-pass filtering of an estimated filter capacitance wattless component value ($Q_{Cf}$) by means of a low-pass filter.

13. The device as claimed in claim 12, wherein the control device has a fourth calculation unit in order to form the estimated filter capacitance wattless component value ($Q_{Cf}$) from the $\alpha$-component of the space vector transformation of the filter capacitance currents ($i_{Cf\alpha}$), from the $\beta$-component of the space vector transformation of the filter capacitance currents ($i_{Cf\beta}$), from an estimated filter capacitance flux vector ($\psi_{Cf,\alpha\beta}$) and from the fundamental frequency angle ($\omega t$) with respect to the fundamental frequency of the filter output current vector ($i_{fg,i}$).

14. The device as claimed in claim 12, wherein, the second calculation unit is additionally used to form the estimated filter capacitance flux vector ($\psi_{Cf,\alpha\beta}$) from an instantaneous DC voltage value ($u_{DC}$) of the energy storage circuit, from the control signal, from the α-component of the space vector transformation ($i_{fi\alpha}$) of the components of the phase connection current vector ($i_{fi,i}$) and from the β-component of the space vector transformation ($i_{fi\beta}$) of the components of the phase connection current vector ($i_{fi,i}$).

15. The device as claimed in claim 11, wherein the control device has a fifth calculation unit in order to form the compensation harmonic power value ($P_h$) and the compensation harmonic wattless component value ($Q_h$), in each case from the α-component of the space vector transformation of the filter output currents ($i_{fg\alpha}$), from the β-component of the space vector transformation of the filter output currents ($i_{fg\beta}$), from an α-component of the space vector transformation of filter output fluxes ($\psi_{L\alpha}$), from a β-component of the space vector transformation of filter output fluxes ($\psi_{L\beta}$) and from the fundamental frequency angle ($\omega t$) with respect to the fundamental frequency of the filter output current vector ($i_{fg,i}$).

16. The device as claimed in claim 9, wherein the difference power value ($P_{diff}$) corresponds to a predeterminable reference power value ($P_{ref}$), and wherein the difference wattless component value ($Q_{diff}$) corresponds to a predeterminable reference wattless component value ($Q_{ref}$).

17. The method as claimed in claim 2, wherein an LCL-filter ($L_{f,i}, C_{fi}, L_{fg,i}$) is connected to each phase connection of the converter unit,
wherein the difference power value ($P_{diff}$) is formed from subtraction of a damping power value ($P_d$) from the sum of a reference power value ($P_{ref}$) and at least one compensation harmonic power valve ($P_h$) with respect to the fundamental frequency of the filter output current vector ($i_{fg,i}$) of the LCL-filter, with the damping power value ($P_d$) being formed from a sum, weighted by a variable damping factor ($k_d$) of a multiplication of an α-component of the space vector transformation of filter capacitance currents ($i_{Cf\alpha}$) of the LCL-filter by an α-component of the space vector transformation ($i_{fi\alpha}$) of the components of the phase connection current vector ($i_{fi,i}$), and multiplication of a β-component of the space vector transformation of filter capacitance currents ($i_{Cf\beta}$) of the LCL-filter by a β-component of the space vector transformation ($i_{fi\beta}$) of the components of the phase connection current vector ($i_{fi,i}$),
wherein the difference wattless component value ($Q_{diff}$) is formed from subtraction of the sum of a reference wattless component value ($Q_{ref}$) and at least one compensation harmonic wattless component value ($Q_h$) with respect to the fundamental frequency of the filter output current vector ($i_{fg,i}$) of the LCL-filter, with the damping wattless component value ($Q_d$) being formed from a difference, weighted by the variable damping factor ($k_d$), of a multiplication of the β-component of the space vector transformation of filter capacitance currents ($i_{Cf\beta}$) of the LCL-filter by the α-component of the space vector transformation ($i_{fi\alpha}$) of the components of the phase connection current vector ($i_{fi,i}$) and multiplication of the α-component of the space vector transformation of filter capacitance currents ($i_{Cf\alpha}$) of the LCL-filter by the β-component of the space vector transformation ($i_{fi\beta}$) of the components of the phase connection current vector ($i_{fi,i}$).

18. The method as claimed in claim 6, wherein the compensation harmonic power value ($P_h$) and the compensation harmonic wattless component value ($Q_h$) are each formed from the α-component of the space vector transformation of the filter output currents ($i_{fg\alpha}$), from the β-component of the space vector transformation of the filter output currents ($i_{fg\beta}$), from an α-component of the space vector transformation of the filter output fluxes ($\psi_{L\alpha}$) from a β-component of the space vector transformation of the filter output fluxes ($\psi_{L\beta}$) and from the fundamental frequency angle ($\omega t$) with respect to the fundamental frequency of the filter output current vector ($i_{fg,i}$).

19. The device as claimed in claim 10, wherein an LCL-filter ($L_{f,i}, C_{fi}, L_{fg,i}$) is connected to each phase connection of the converter unit,
wherein the control device has a second adder in order to form the difference power value ($P_{diff}$) from the subtraction of a damping power value ($P_d$) from the sum of a reference power value ($P_{ref}$) and at least one compensation harmonic power value ($P_h$) with respect to the fundamental frequency of the filter output current vector ($i_{fg,i}$) of the LCL-filter, with the control device having a third calculation unit (9) in order to form the damping power value ($P_d$) from a sum which is weighted with a variable damping factor ($k_d$) of a multiplication of an α-component of the space vector transformation of the filter capacitance currents ($i_{Cf\alpha}$) of the LCL-filter by an α-component of the space vector transformation ($i_{fi\alpha}$) of the components of the phase connection current vector ($i_{fi,i}$) and multiplication of a β-component of the space vector transformation of filter capacitance currents ($i_{Cf\beta}$) of the LCL-filter by a β-component of the space vector transformation ($i_{fi\beta}$) of the components of the phase connection current vector ($i_{fi,i}$),
wherein the control device has a third adder in order to form the difference wattless component value ($Q_{diff}$) from the subtraction of the sum of a reference wattless component value ($Q_{ref}$) and at least one compensation harmonic wattless component value ($Q_h$) with respect to the fundamental frequency of the filter output current vector ($i_{fg,i}$) of the LCL-filter, with the third calculation unit additionally being used to form the damping wattless component value ($Q_d$) from a difference, which is weighted with the variable damping factor ($k_d$) between a multiplication of the β-component of the space vector transformation of filter capacitance currents ($i_{Cf\beta}$) of the LCL-filter by the α-component of the space vector transformation ($i_{fi\alpha}$) of the components of the phase connection current vector ($i_{fi,i}$), and multiplication of the α-component of the space vector transformation of filter capacitance currents ($i_{Cf\alpha}$) of the LCL-filter by the β-component of the space vector transformation ($i_{fi\beta}$) of the components of the phase connection current vector ($i_{fi,i}$).

20. The device as claimed in claim 14, wherein the control device has a fifth calculation unit in order to form the compensation harmonic power value ($P_h$) and the compensation harmonic wattless component value ($Q_h$), in each case from the α-component of the space vector transformation of the filter output currents ($i_{fg\alpha}$), from the β-component of the space vector transformation of the filter output currents ($i_{fg\beta}$), from an α-component of the space vector transformation of filter output fluxes ($\psi_{L\alpha}$), from a β-component of the space vector transformation of filter output fluxes ($\psi L_\beta$) and from the fundamental frequency angle ($\omega t$) with respect to the fundamental frequency of the filter output current vector ($i_{fg,i}$).

* * * * *